United States Patent
Huang et al.

(10) Patent No.: US 12,373,436 B2
(45) Date of Patent: Jul. 29, 2025

(54) DATA QUERY METHOD AND APPARATUS BASED ON DORIS, STORAGE MEDIUM AND DEVICE

(71) Applicant: BEIJING VOLCANO ENGINE TECHNOLOGY CO., LTD., Beijing (CN)

(72) Inventors: Zhaowei Huang, Beijing (CN); Leilei Hu, Beijing (CN); Junling Du, Beijing (CN); Xuan Luo, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/470,184

(22) Filed: Sep. 19, 2023

(65) Prior Publication Data

US 2024/0095246 A1    Mar. 21, 2024

(30) Foreign Application Priority Data

Sep. 20, 2022   (CN) .......................... 202211145425.2

(51) Int. Cl.
*G06F 16/2455* (2019.01)
*G06F 16/21* (2019.01)
*G06F 16/242* (2019.01)

(52) U.S. Cl.
CPC ...... *G06F 16/24552* (2019.01); *G06F 16/219* (2019.01); *G06F 16/244* (2019.01)

(58) Field of Classification Search
CPC . G06F 16/24552; G06F 16/219; G06F 16/244
USPC .......................................................... 707/722
See application file for complete search history.

(56) References Cited

U.S. PATENT DOCUMENTS

| | | | | |
|---|---|---|---|---|
| 8,768,867 | B1 * | 7/2014 | Thaeler | G06Q 30/02 706/12 |
| 11,989,096 | B2 * | 5/2024 | MacLean | G06F 11/1451 |
| 2003/0220860 | A1 * | 11/2003 | Heytens | G06Q 30/0201 705/7.29 |
| 2017/0177446 | A1 * | 6/2017 | MacLean | G06F 11/3082 |

(Continued)

FOREIGN PATENT DOCUMENTS

| | | | |
|---|---|---|---|
| CN | 105488148 A | * | 4/2016 |
| CN | 107819838 A | * | 3/2018 |

(Continued)

*Primary Examiner* — Phuong Thao Cao
(74) *Attorney, Agent, or Firm* — Alleman Hall & Tuttle LLP

(57) ABSTRACT

A data query method based on Doris includes: acquiring history data in a bottom operator in a storage engine architecture of the Doris, and performing an aggregation calculation on the history data to obtain an aggregation result of the history data; caching, by a preset cache system, the aggregation result of the history data; performing an aggregation calculation on real-time data in a newly inserted bottom operator in the Doris, in response to a data query request, to obtain an aggregate result of the real-time data; acquiring the aggregation result of the history data from the preset cache system, and merging the aggregation result of the history data with the aggregation result of the real-time data to obtain merged data; and sending, by a data sending operator in the Doris, the merged data to an upper layer of an execution engine, to output a final data query result.

11 Claims, 7 Drawing Sheets

(56) References Cited

U.S. PATENT DOCUMENTS

| | | | | |
|---|---|---|---|---|
| 2018/0239615 A1* | 8/2018 | Ravid | ................... | G06F 9/4494 |
| 2022/0107949 A1* | 4/2022 | Zhen | ................ | G06F 16/24539 |
| 2022/0327123 A1* | 10/2022 | Ajmera | ............... | G06F 16/2455 |
| 2022/0398244 A1* | 12/2022 | Li | ...................... | G06F 16/2477 |
| 2024/0171657 A1* | 5/2024 | Sharma Banjade | .... | H04L 67/61 |

FOREIGN PATENT DOCUMENTS

| | | | | | |
|---|---|---|---|---|---|
| CN | 112115114 | A | * | 12/2020 | ............ G06F 16/113 |
| CN | 112633761 | A | * | 4/2021 | ....... G06F 16/24552 |
| CN | 110647512 | B | * | 5/2022 | ......... G06F 16/1815 |
| CN | 114491199 | A | * | 5/2022 | ......... G06F 16/2228 |
| CN | 110502539 | B | * | 7/2022 | ....... G06F 16/24552 |
| CN | 115098582 | A | * | 9/2022 | |
| CN | 115422237 | A | * | 12/2022 | |
| CN | 115994159 | A | * | 4/2023 | |
| DE | 112020002310 | T5 | * | 2/2022 | ........... H04L 47/127 |

* cited by examiner

DATA QUERY METHOD AND APPARATUS BASED ON DORIS, STORAGE MEDIUM AND DEVICE

This application claims priority to Chinese Patent Application No. 202211145425.2, titled "DATA QUERY METHOD AND APPARATUS BASED ON DORIS, STORAGE MEDIUM AND DEVICE", filed on Sep. 20, 2022 with the China National Intellectual Property Administration, which is incorporated herein by reference in its entirety.

FIELD

The present disclosure relates to the field of computer technology, and in particular to a data query method based on Doris, a data query apparatus based on Doris, a storage medium and a device.

BACKGROUND

In the conventional technology, in order to improve data query concurrency capability of Doris, two caching mechanisms, i.e., Structured Query Language (SQL) Cache and partition cache, are usually used. However, the main application scenarios of these two caching mechanisms are for offline query. For real-time data query, these two caching mechanisms have a poor concurrency effect. SQL Cache stores and obtains the cache according to a signature of SQL, an Identity document (ID) of a partition of a queried table, and the latest version of the partition. That is, a cache data set is determined based on the combination of the three factors. If any one of them changes, such as the SQL is changed, the query fields or conditions are different, or the version after updating the data is changed, it will cause the failure of hitting the cache, i.e., the specified data cannot be queried. The Partition Cache splits SQL in parallel, and identifies read-only partitions and updateable partitions. The read-only partitions are used to cache and the update partitions are not used to cache. If SQL is used to query data for a period of time such as a week, the partition cache can indeed cache more calculation results. Nevertheless, most of the real-time tasks query the data tasks of the day, rather than query data cross days. Therefore, the real-time data needs to be read and calculated in full. The partition of Doris does not set in hours, otherwise the metadata of Doris will overwhelm the metadata of the entire frontend (FE) node, which leads to the poor concurrency of Doris data query.

SUMMARY

An object of the embodiments of the present application is to provide a data query method based on Doris, a data query apparatus based on Doris, a storage medium and a device, which can save the input/output (TO) and central processing unit (CPU) calculation resources to improve the query concurrency effect by caching the calculation results of the bottom operators in Doris.

A data query method based on Doris is provided according to the embodiments of the present disclosure. The method includes:
acquiring history data in a bottom operator in a storage engine architecture of the Doris, and performing an aggregation calculation on the history data to obtain an aggregation result of aggregated history data in the bottom operator;
caching, by a preset cache system, the aggregation result of the history data;
performing an aggregation calculation on real-time data in a newly inserted bottom operator in the Doris, in response to a data query request on the Doris, to obtain an aggregate result of the real-time data;
acquiring the aggregation result of the history data from the preset cache system, and merging the aggregation result of history data with the aggregation result of the real-time data to obtain merged data; and
sending, by a data sending operator in the Doris, the merged data to an upper layer of an execution engine, to output a final data query result.

In an implementation, the caching, by a preset cache system, the aggregation results of the history data includes:
caching, by the preset cache system, the aggregation result of the history data in a key-value pair manner.

In an implementation, a key of the aggregation result of the history data includes at least one of a bottom operator reader, a filter, a column, a local aggregation operator, and a sort operator.

In an implementation, a storage structure of a value of the aggregation result of the history data is a result block list.

In an implementation, the merging the aggregation results of history data with the aggregation result of the real-time data to obtain merged data includes:
in a case that a top layer of the key of the aggregation result of the history data is the bottom operator reader, the filter or the column, organizing the aggregation result of the history data and the aggregation result of the real-time data in a list manner, and performing union processing on the aggregation result of the history data and the aggregation result of the real-time data to obtain processed data; or
in a case that the top layer of the key of the aggregation result of the history data is the local aggregation operator, organizing the aggregation result of the history data and the aggregation result of the real-time data in a hash manner, performing a hash processing on the aggregation result of the real-time data, and inserting an obtained processed result into a hash result corresponding to the aggregation result of the history data; or
in a case that the top layer of the key of the aggregation result of the history data is the sort operator, organizing the aggregation result of the history data and the aggregation result of the real-time data by using an ordered list manner or an ordered hash map manner, and inserting the aggregation result of the real-time data into an ordered result set in an insertion sort manner.

In an implementation, the method further includes: in a case that a preset expiration time and/or cache capacity is reached in the preset cache system, deleting the aggregation result of history data with a lowest usage frequency in the preset cache system by using a least recently used algorithm.

In an implementation, the preset cache system is a memory.

A data query apparatus based on Doris is further provided according to the embodiments of the present disclosure. The apparatus includes: a first calculating unit, a caching unit, a second calculating unit, a merging unit and a feedback unit.

The first calculating unit is configured to acquire history data in a bottom operator in a storage engine architecture of the Doris, and perform an aggregation calculation on the history data to obtain an aggregation result of the aggregated history data in the bottom operators.

The caching unit is configured to cache the aggregation result of the history data by a preset cache system.

The second calculating unit is configured to perform an aggregation calculation on real-time data in a newly inserted bottom operator in the Doris, in response to a data query request on the Doris, to obtain an aggregate result of the real-time data.

The merging unit is configured to acquire the aggregation result of the history data from the preset cache system, and merge the aggregation result of the history data with the aggregation result of the real-time data to obtain merged data.

The feedback unit is configured to send the merged data to an upper layer of an execution engine by a data sending operator in the Doris, to output a final data query result.

In an implementation, the caching unit is specifically configured to cache the aggregation result of the history data in a key-value pair manner by the preset cache system.

In an implementation, a key of the aggregation result of the history data includes at least one of a bottom operator reader, a filter, a column, a local aggregation operator, and a sort operator.

In an implementation, a storage structure of a value of the aggregation result of the history data is a result block list.

In an implementation, the merging unit is specifically configured to:
organize the aggregation result of the history data and the aggregation result of the real-time data in a list manner and perform union processing on the aggregation result of the history data and the aggregation result of the real-time data to obtain processed data, in a case that a top layer of the key of the aggregation result of the history data is the bottom operator reader, filter or column; or
organize the aggregation result of the history data and the aggregation result of the real-time data in a hash manner, perform a hash processing on the aggregation result of the real-time data, and insert an obtained processed result into the hash result corresponding to the aggregation result of the history data, in a case that the top layer of the key of the aggregation result of the history data is a local aggregation operator; or
organize the aggregation result of the history data and the aggregation result of the real-time data in an ordered list or ordered hash map manner, and insert the aggregation result of the real-time data into an ordered result set in an insertion sort manner, in a case that the top layer of the key of the aggregation result of the history data is a sort operator.

In an implementation, the apparatus further includes: a deletion unit configured to delete the aggregation result of history data with a lowest usage frequency in the preset cache system by using a least recently used algorithm, in a case that a preset expiration time and/or cache capacity is reached in the preset cache system.

In an implementation, the preset cache system is a memory.

A data query device based on Doris is provided according to an embodiment of the present disclosure. The device includes: a processor, a memory, and a system bus. The processor and the memory are connected through the system bus. The memory is configured to store one or more programs including instructions. The instructions, when executed by the processor, cause the processor to implement any implementation of the above data query method based on Doris.

A computer-readable storage medium is provided according to an embodiment of the present disclosure. Instructions are stored on the computer-readable storage medium. The instructions, when running on a terminal device, cause the terminal device to implement any implementation of the above data query method based on Doris.

A data query method based on Doris, a data query apparatus based on Doris, a storage medium, and a device are provided according to the embodiments of the present disclosure. First, history data in a bottom operator in a storage engine architecture of the Doris is obtained, and an aggregation calculation are performed on the history data to obtain an aggregation result of the aggregated history data in the bottom operator. Then, the aggregation result of the history data are cached by a preset cache system, in response to a data query request on the Doris, an aggregation calculation is performed on real-time data in a newly inserted bottom operator in the Doris to obtain an aggregate result of the real-time data. The aggregation result of the history data is obtained from the preset cache system, and the aggregation result of the history data is merged with the aggregation result of the real-time data to obtain merged data. The merged data is sent to an upper layer of execution engine by a data sending operator in the Doris, to output a final data query result. In the embodiment of the present disclosure, the aggregation result of the history data in the bottom operator is first cached. Thus, when the data query is performed on Doris, only the real-time data in the newly inserted bottom operator needs to be aggregated and calculated, and other aggregation results of history data can be obtained directly from the cache, which can save calculation resources of IO and CPU and improve query concurrency.

BRIEF DESCRIPTION OF THE DRAWINGS

In order to more clearly illustrate the embodiments of the present disclosure or the technical solutions in the conventional technology, the drawings used in the description of the embodiments or the conventional technology are briefly introduced below. It is apparent that, for those skilled in the art, other drawings can be obtained according to the provided drawings without any creative effort.

DETAILED DESCRIPTION OF EMBODIMENTS

Figure 1:
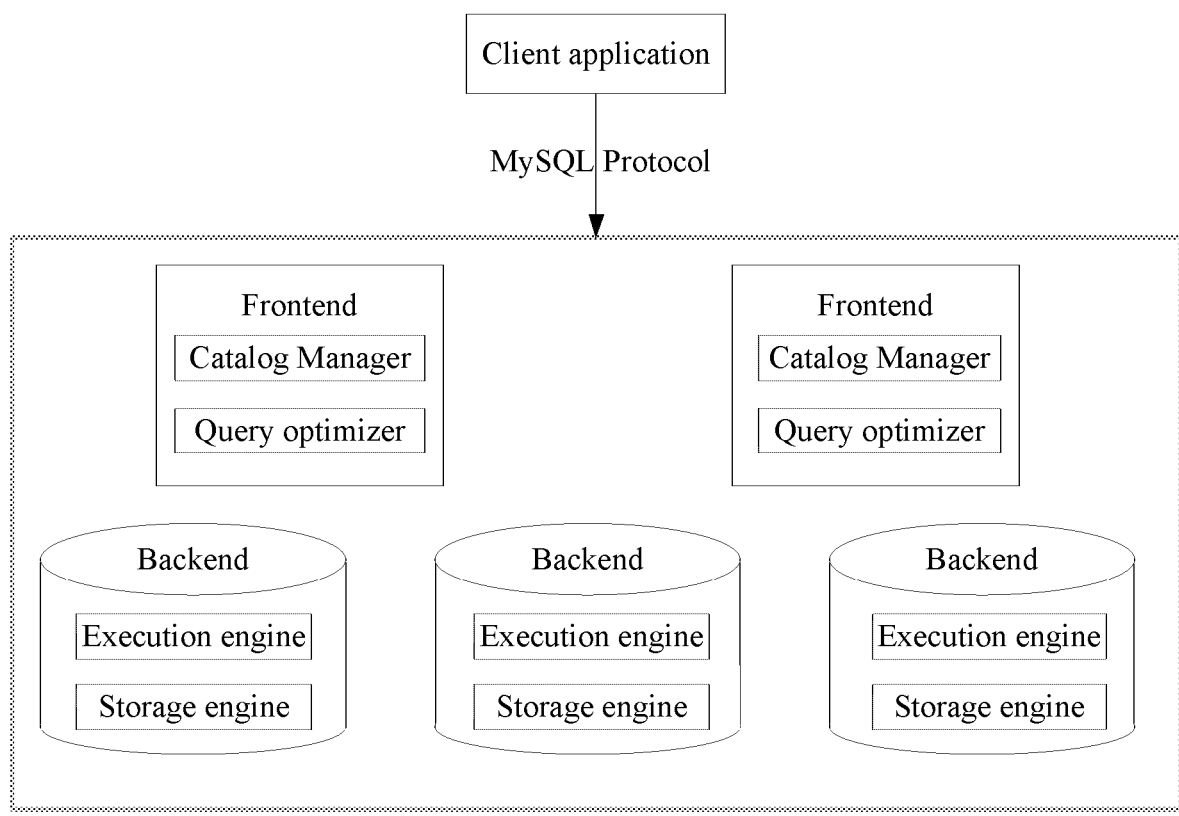
FIG. 1 is a schematic diagram of an architecture of Doris according to an embodiment of the present disclosure.

Doris is a high-performance analytical data warehouse, which may achieve multi-dimensional, real-time, and high-concurrency data analysis by technologies such as vectorization, distributed execution framework (Massively Parallel Processing, MPP), and a columnar storage engine that can be updated in real time. Doris supports efficient data import from various real-time and offline data sources, and supports direct analysis of data in various formats on the data lake. A schematic diagram of architecture of Doris is shown in FIG. 1. The core of the architecture of Doris includes two types of processes: frontend (FE) nodes and backend nodes (BE), which does not rely on any external components and is convenient for deployment and maintenance. In addition, on-line horizontal scaling may be performed on both FE and BE nodes, and both metadata and data have data replication to ensure no single point of failure in the entire system.

FE is used to manage metadata and a connection to the client, perform query planning and query scheduling, etc. BE is used for data storage and execution of structured query language (SQL).

In terms of data storage, the BE nodes of Doris are completely equivalent. FE distributes data to the corresponding BE nodes in a certain strategy. When data is imported, the data will be written directly to the BE nodes, rather than be transferred through FE. BE is used to write the imported data into a corresponding format and generate related indexes.

In a process of SQL calculations, one SQL statement is first planned into logical execution units according to specific semantics, and then is split into specific physical execution units according to the distribution of data. The physical execution units may be executed on the data storage nodes, which can avoid data transmission and copy, to obtain the good query performance.

From the external perspective, Doris, shows as a whole, is a MySQL protocol interface that supports standard SQL syntax. Users can query and analyze the data in Doris through the existing MySQL client.

Figure 2:
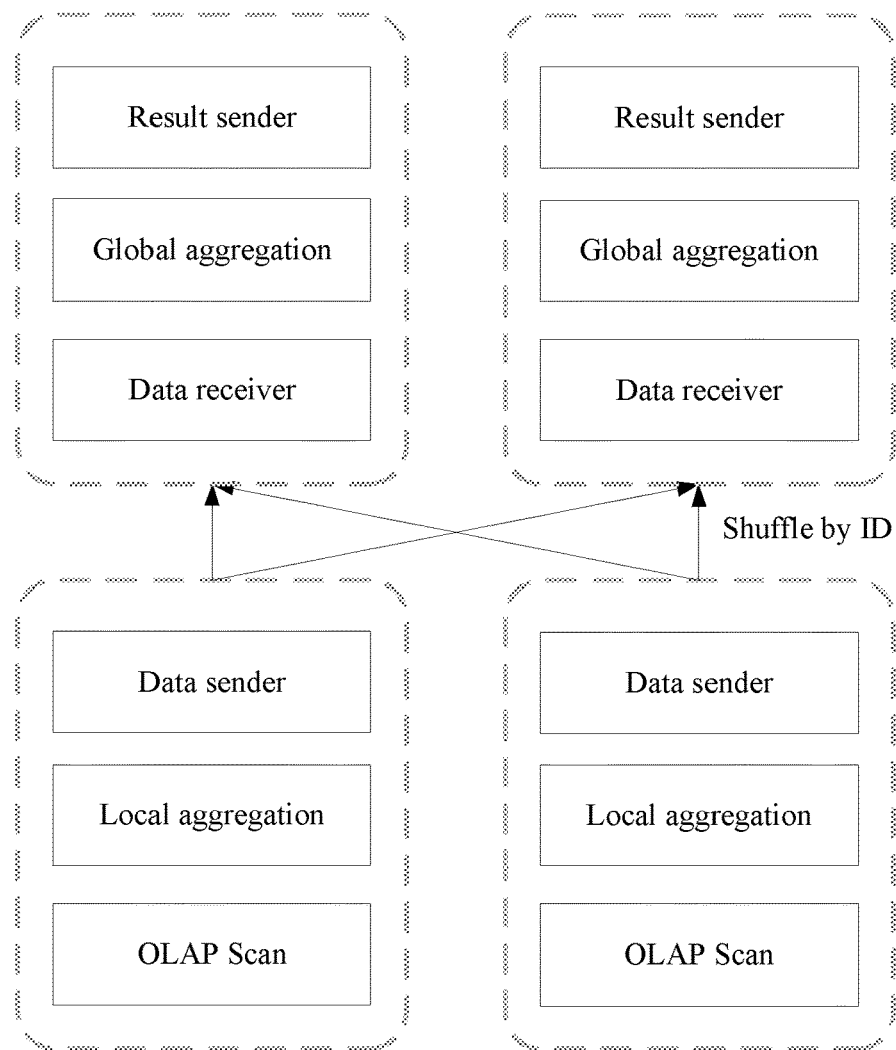
FIG. 2 is a schematic diagram of a MPP distributed execution framework according to an embodiment of the present disclosure.

A schematic diagram of MPP distributed execution framework of Doris is shown in FIG. 2. In this MPP execution framework, one SQL data query request is split into multiple physical calculation units and executed in parallel on multiple devices. Each execution node has exclusive resources (such as CPU, memory, etc.). For example, for a SQL statement "select id count(*) from Table group by id", the execution side of Doris may split it into the physical execution process shown in FIG. 2. The dashed line block in FIG. 2 represents the execution unit, which is called to the BE node for execution. In the example, the above SQL includes two layers of tasks, which are connected through a shuffle process composed of the data sending operators (Data Sender) and the data receiving operators (Data Receiver). Each layer is split into two buckets. These four execution units are sent to the BE side for execution simultaneously. After the data query calculation is completed, the data query result may be sent to the FE side of Doris through the result sending operators (Result Sender) for display or output.

Figure 3:
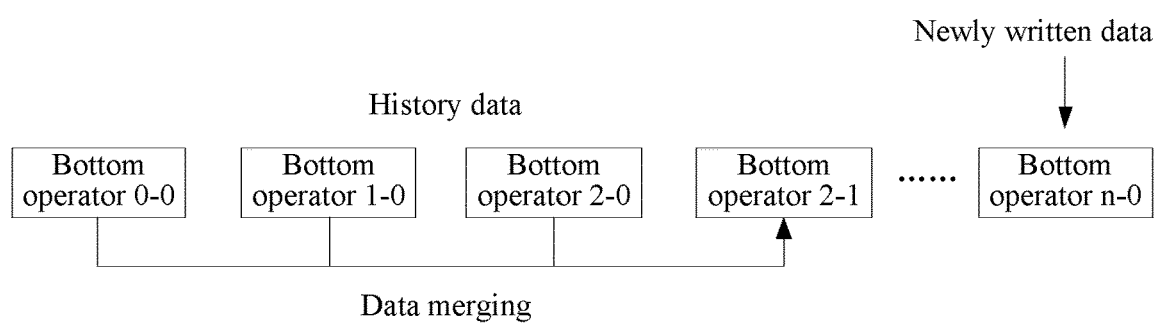
FIG. 3 is an exemplary diagram of a storage engine architecture according to an embodiment of the present disclosure.

An exemplary diagram of architecture of a storage engine based on Doris is shown in FIG. 3. As shown in FIG. 3, a storage structure of Doris is similar to a structure of a log structure merge (LSM) tree. In a table, the internal data is composed of the most bottom operators (i.e., RowSet can be regarded as a file set composed of multiple rows). The RowSet contains number and version information. Once new data is written, a new RowSet will be generated, such as the "bottom operator n-0" shown in FIG. 3. It should be noted that even if the model is aggregated or the model table is updated in Doris, only a new RowSet may be generated, instead of modifying the RowSet. Moreover, according to the size of the target file including the RowSet, the history data in the RowSet can be merged asynchronously. That is, multiple small RowSets are merged into a large RowSet to generate a merged RowSet, and the initial RowSets before merged is deleted. As shown in FIG. 3, after the bottom operator 0-0, bottom operator 1-0, and bottom operator 2-0 are merged into the bottom operator 2-1, the bottom operator 0-0, bottom operator 1-0, and bottom operator 2-0 are deleted.

Figure 4:
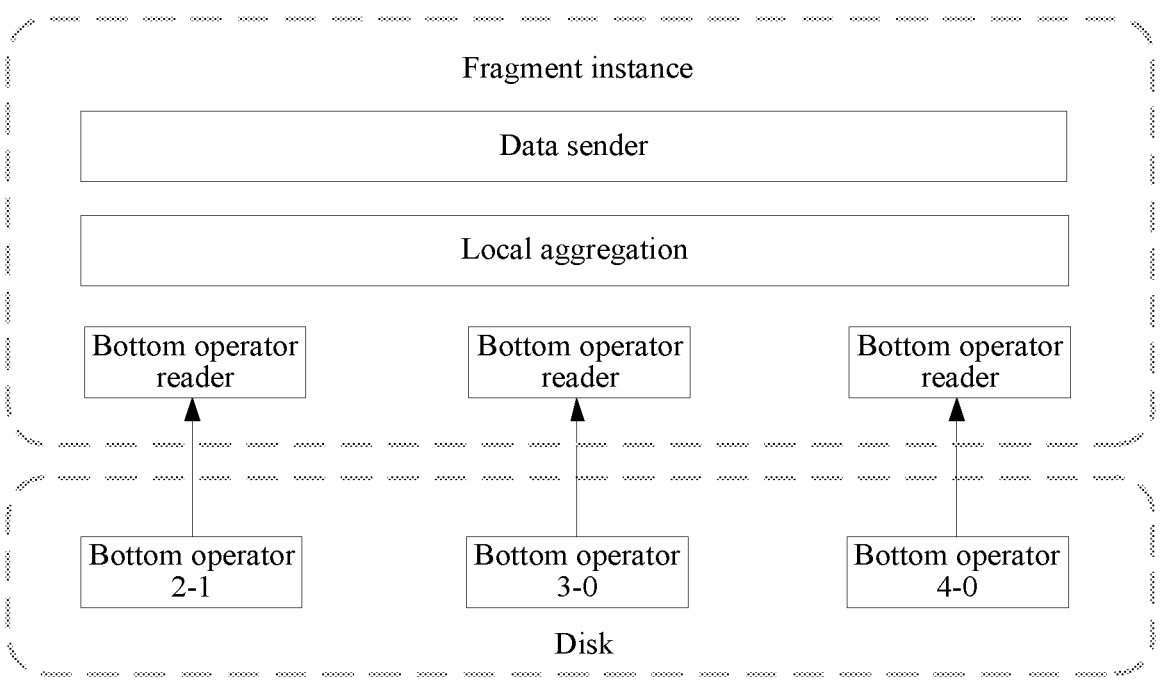
FIG. 4 is an exemplary diagram of a flow of data query calculation according to an embodiment of the present disclosure.

The MPP distributed execution framework shown in FIG. 2 is combined with the storage engine architecture shown in FIG. 3 to realize a flow example diagram of data query calculation as shown in FIG. 4. It is still taken a fragment instance of the SQL statement "select id count(*) from Table group by id" on the storage side as an example. In the conventional data query method based on Doris, the on-line analytical processing scan (OLAPScan) on the bottom is converted into a bottom operator reader (RowSetReader) to read data in the corresponding RowSet, to read the data in the disk into the memory. In the actual implementation process, the times of reading data is consistent with the number of the RowSets. Even if the SQL tasks are consistent, the second SQL task still re-reads all history data for recalculation, which results in a low query concurrency of the entire Doris and cannot apply to high-concurrency scenarios.

In this regard, in order to improve the data query concurrency of Doris, two caching mechanisms, i.e., SQL Cache and Partition Cache, are usually used in the conventional technology. However, the main application scenarios of these two caching mechanisms are for offline queries. For real-time data queries, these two caching mechanisms have a poor concurrency effect. When a real-time data table is queried, real-time data can be newly written every second. In this case, the caching mechanism using SQL Cache must fail. Partition Cache splits SQL in parallel, read-only partitions and update partitions are identified, the read-only partitions is used to cache, but the update partitions are not used to cache. If SQL is used to query the amount of data for a period of time such as a week, more calculation results may be cached. Nevertheless, most of the real-time tasks query the data tasks of the day, rather than query data cross days. Therefore, the real-time data needs to be read and calculated in full. The partition of Doris basically does not be set in hours, otherwise the metadata of Doris can overwhelm the metadata of the entire FE node. In addition, because Partition Cache requires that SQL can be split in parallel, the usage scenario is limited to an aggregation operation on partition granularity. Once aggregations in other dimensions appear, it cannot be operated.

Therefore, the two caching mechanisms, SQL Cache and Partition Cache, which are often used in the conventional technology, have poor query concurrency for the real-time data in Doris.

In order to solve the above defects, a data query method based on Doris is provided according to the present disclosure. First, history data in a bottom operator in a storage engine architecture of the Doris is obtained, and an aggregation calculation is performed on the history data to obtain an aggregation result of the aggregated history data in the bottom operator. Then, the aggregation result of the history data is cached by a preset cache system. In response to a data query request on the Doris, an aggregation calculation is performed on real-time data in a newly inserted bottom operator in the Doris to obtain an aggregate result of the real-time data. The aggregation result of history data is acquired from the preset cache system and the aggregation result of history data is merged with the aggregation result of the real-time data to obtain merged data. The merged data is sent to an upper layer of execution engine by a data sending operator in the Doris to output a final data query result. In the embodiment of the present disclosure, the aggregation result of the history data in the bottom operator is first cached. Thus, when the data query is performed on Doris, only the real-time data in the newly inserted bottom operator needs to be aggregated and calculated, and other aggregation results of history data can be obtained directly from the cache, which can save calculation resources of IO and CPU and improve query concurrency.

In order to clarify the purposes, technical solutions and advantages of the embodiments of the present disclosure, the technical solutions in the embodiments of the present application will be clearly and completely described below in conjunction with the drawings in the embodiments of the present disclosure. Obviously, the described embodiments are only a part of the embodiments of the present disclosure, rather than all of them. Based on the embodiments in the present disclosure, all other embodiments obtained by those ordinary skilled in the art without making creative efforts belong to the protection scope of the present disclosure.

First Embodiment

Figure 5:
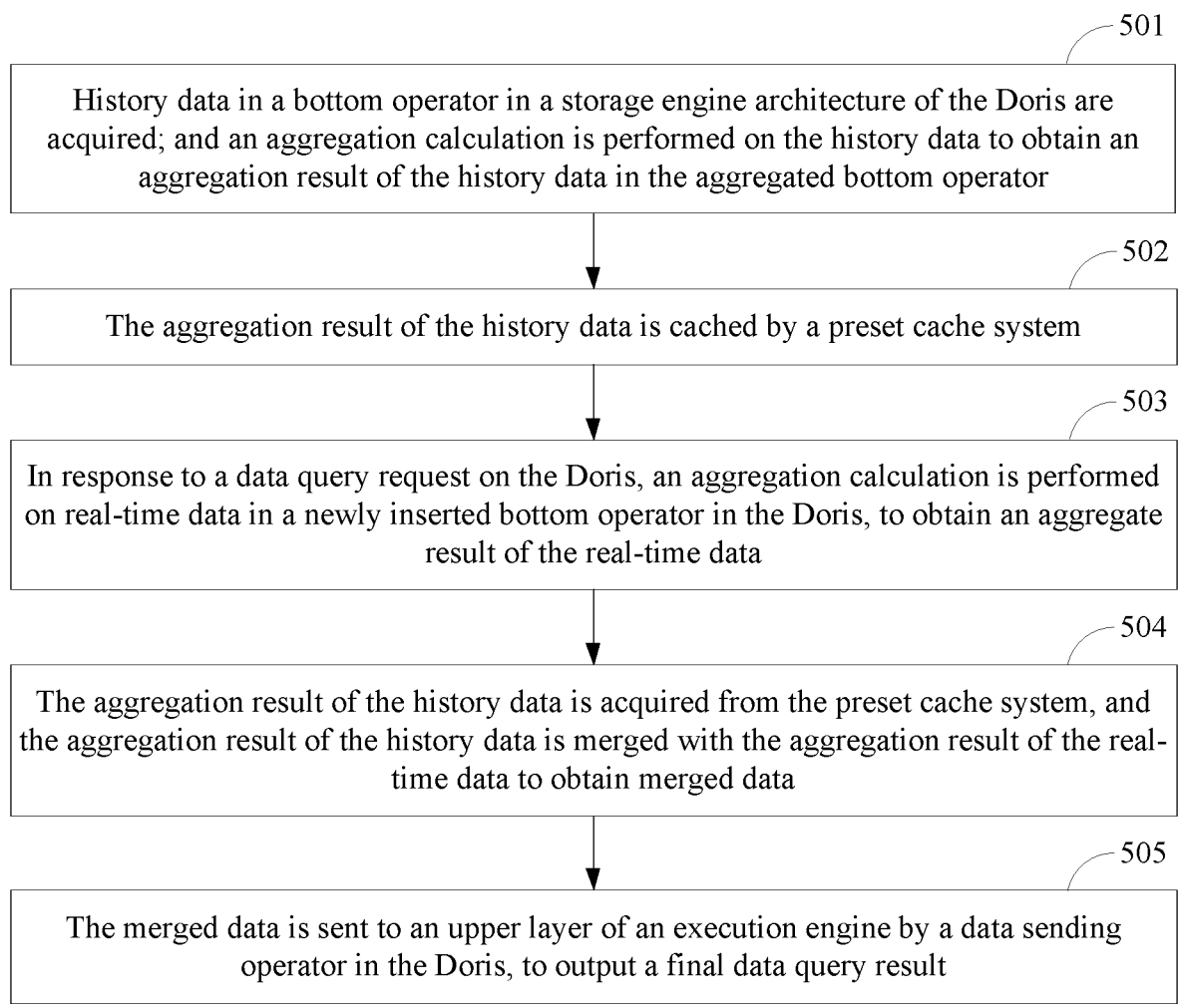
FIG. 5 is a schematic flowchart of a data query method based on Doris according to an embodiment of the present disclosure.

FIG. 5 is a schematic flowchart of a data query method based on Doris according to an embodiment of the present disclosure. Referring to FIG. 5, the method includes steps S501 to S505 as follows.

In S501, history data in a bottom operator in a storage engine architecture of the Doris are acquired; and an aggregation calculation is performed on the history data to obtain an aggregation result of the history data in the aggregated bottom operator.

In this embodiment, in order to improve the concurrency effect of data query based on Doris, a solution that saves calculation resources of IO and CPU by caching the calculation result of the bottom operator in Doris is provided in the present disclosure, to improve the concurrency effect of data query.

Specifically, it is first necessary to obtain the history data in the bottom operator in the storage engine architecture of Doris, and then aggregate (Agg) the history data to obtain an aggregation result of the aggregated history data in the bottom operator. The aggregation result is used to realize fast data query in Doris by implement subsequent steps S502 to S505.

Figure 6:
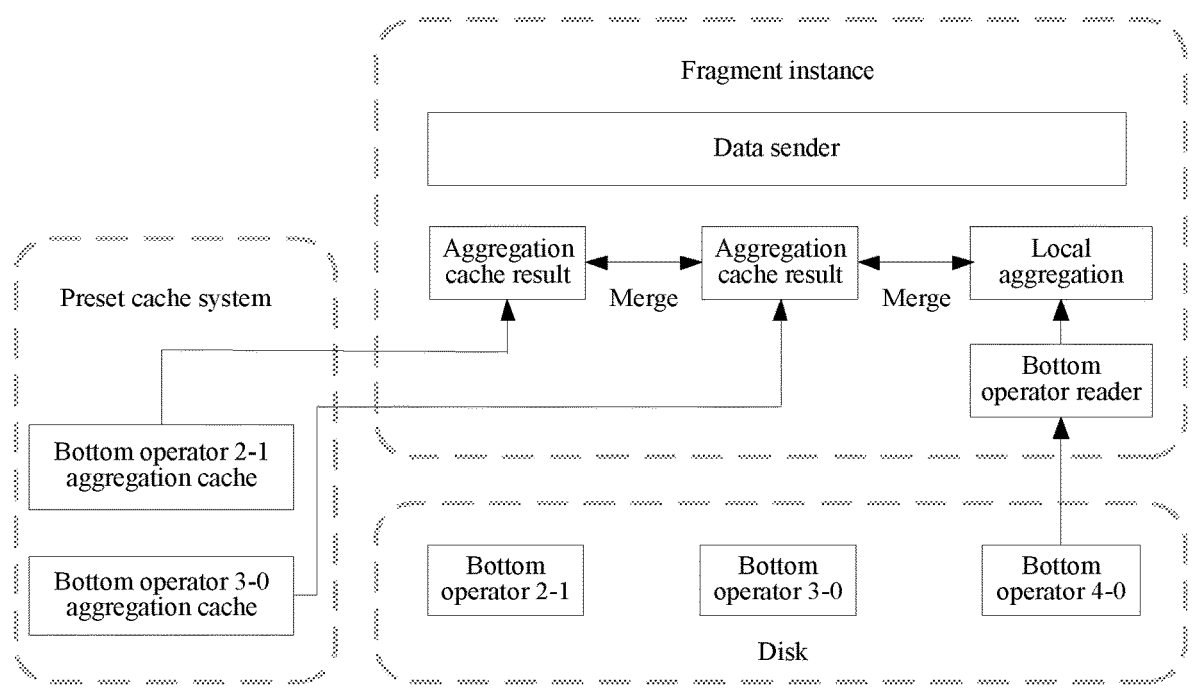
FIG. 6 is an exemplary diagram of an overall process of a data query based on Doris according to an embodiment of the present disclosure.

For example, as shown in FIG. 6, it is assumed that the bottom operator 2-1 and the bottom operator 3-0 in a disk store history data, and the bottom operator 4-0 contains newly written real-time data. After the history data of the bottom operator 2-1 and the history data of the bottom operator 3-0 are obtained from the disk, the aggregation calculation may be performed according to ids of the data to obtain the corresponding aggregation results, i.e., "an aggregation result of the bottom operator 2-1" and "an aggregation result of the bottom operator 3-0".

In S502, the aggregation result (Agg result) of the history data is cached by a preset cache system.

In this embodiment, after the history data is aggregated through step S501 to obtain the aggregation result of the aggregated history data in the bottom operator, the aggregation result of the history data may, further, be cached through the preset cache system. In this way, in a subsequent data query process, the Agg results of the history data may be obtained directly from the cache without repeatedly reading all the history data and performing the aggregation calculations. In this way, only the aggregation calculation of real-time data need to be performed through the subsequent step S503, and then the above calculation results in step S502 and step 503 may be merged (Merger), which can reduce resource wastes of the IO and CPU at the same time.

It should be noted that the specific composition of the preset cache system is not limited in the embodiments of the present disclosure, which can be set according to practical conditions. In an optional implementation, a memory may be used as the preset cache system, or other third-party storage systems, such as remote dictionary server (Redis) or Memcache, may be used as the preset cache system.

For example, as shown in FIG. 6, based on the above example, the history data of the bottom operator 2-1 and the history data of the bottom operator 3-0 are obtained from the disk, and the aggregation calculation are performed according to the ids of the data (e.g., 10,000 pieces of data with the same id value of 1 are aggregated, and 30,000 pieces of data with the same id value of 2 are aggregated, etc.), to obtain the corresponding aggregation results as "the aggregation result of the bottom operator 2-1" and "the aggregation result of the bottom operator 3-0". These aggregation results may be cached by the preset cache system, i.e., "bottom operator 2-1 aggregation cache" and "bottom operator 3-0 aggregation cache" as shown in FIG. 6 for subsequent steps.

Specifically, in an optional implementation, the implementation process of step S502 may include: caching the aggregation result of history data in a key-value pair manner (i.e., key and value) by the preset caching system.

Figure 7:
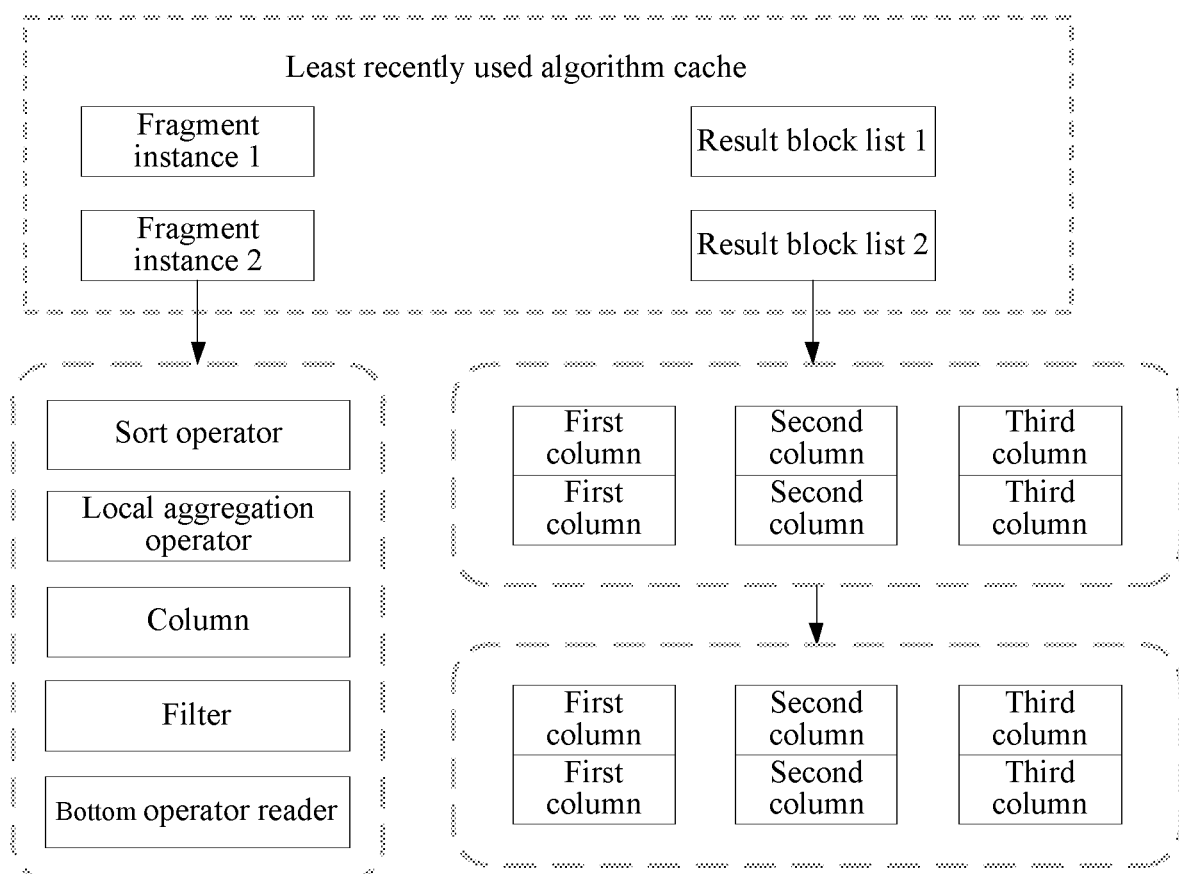
FIG. 7 is a schematic diagram of caching an aggregation result of history data in a key-value pair manner according to an embodiment of the present disclosure.

In an optional implementation of this present disclosure, the key of the aggregation result of history data is set in the form of a logical fragment instance, which includes metadata information of all nodes in the scan node (ScanNode) except the data sender. As shown in FIG. 7, the key of the aggregation result of history data may contain 5 layers of node data, among which the bottom operator reader (RowSetReader) is indispensable. In addition, the key of the aggregation result of history data may further include at least one of a filter (Filter), a column (Project), local aggregation operator (Local Agg) and sort operator (Local Sort).

As shown in FIG. 7, metadata information stored in the bottom operator reader (RowSetReader (id List)), is mainly an id list of the RowSets, which indicates RowSet data saved in the cache. Metadata stored in the Filter (predicts)) is a predicate expression, which is accurate to the value in the expression. For example, where a=1 and where a=2 indicates different caches. Column (Project (fields)) refers to a column returned after column pruning. For example, select a, sum (b) and select a, count (b) may hit the same cache. Local aggregation Operator (Local Agg(fileds+function)) refers to an aggregation operator, in which the stored metadata is the aggregated field, the aggregated function, and the field in the functions. For example, "Select a, sum (b)" needs to include the Agg field a and the function sum(b). If the function includes a predicate expression, the value of the predicate expression also needs to be included, such as select a, sum(case when (b==0) then b else 0) etc. The metadata stored in the sort operator (Local Sort (sort fields)) includes a sort field.

In an optional implementation of the present disclosure, the value of the aggregation result of history data is set in the form of a result block list (Trunk List). As shown in FIG. 7, the calculation result is stored in the memory by using the trunk. The trunk is a column-oriented storage structure in the memory. Data stored in column-oriented trunk has no header information. Metadata information may be calculated from the value of the above key. By setting the value in the form of trunk list, when the data in RowSets is merged, multiple memories only need to be connected with a linked list, rather than moving data in the memory in some scenarios, thereby improving data processing efficiency.

In S503, in response to a data query request on the Doris, an aggregation calculation is performed on real-time data in a newly inserted bottom operator in the Doris, to obtain an aggregate result of the real-time data.

In this embodiment, after the aggregation result of the history data is cached by using the preset cache system (e.g., the memory) in step S502, when a data query request (e.g., the above SQL data query statement) in Doris is received from the user, it is necessary to aggregate the real-time data in the newly inserted RowSet in the Doris in response to the data query request, to obtain an aggregated result of the real-time data for performing the subsequent step S504.

For example, as shown in FIG. 6, based on the above example, after the data query request in the Doris is received from the user, the bottom operator reader may be used to acquire the newly written data in the bottom-layer operator 4-0, in response to the data query request. The real-time data is aggregated according to the id of the data to obtain the aggregated result of the real-time data, that is, the "local aggregation" in FIG. 6. The aggregated result of the real-time data is used to implement the subsequent step S504.

In S504, the aggregation result of the history data is acquired from the preset cache system, and the aggregation result of the history data is merged with the aggregation result of the real-time data to obtain merged data.

In this embodiment, after the aggregation result of real-time data is obtained through step S503, the aggregation result of history data may be acquired from the preset cache system, and the aggregation result of history data and the aggregation result of real-time data may be merged to obtain the merged data to implement the subsequent step S505, which can reduce resource wastes of IO and CPU at the same time.

Specifically, in an optional implementation, the aggregation result of history data may be merged with the aggregation result of real-time data in different ways according to the different contents contained in the keys of the aggregation results of history data mentioned above, to obtain the merged data. The specific implementation process is as follows:

In the case that the top layer of the key of the aggregation result of history data is RowSetReader, Filter or Project, the aggregation result of history data and the aggregation result of real-time data may be organized in a list manner, and union processing is performed on the aggregation result of the history data and the aggregation result of the real-time data to obtain processed data. That is, only a simple union between the aggregation result of history data and the aggregation result of real-time data need to be performed, and then the processed data flows into the next node for subsequent processing.

Alternatively, in the case that the top layer of the key of the aggregation result of history data is the Local Agg, the aggregation result of history data and the aggregation result of real-time data may be organized in a hash manner; a hash processing is performed on the aggregation result of real-time data, and the processed result is inserted into a hash result corresponding to the aggregation result of the history data. That is, after the hash processing is performed on the aggregation result of the real-time data through Agg Filed, the processed aggregation result of the real-time data may be inserted into the hash result corresponding to the cached aggregation result of the history data.

Alternatively, in the case that the top layer of the key of the aggregation result of the history data is the Local Sort, the aggregation result of the history data and the aggregation result of the real-time data may be organized in an ordered list manner or an ordered hash map manner. Thus, the aggregation result of the real-time data may be inserted into the ordered result set by an insertion sort manner.

In S505, the merged data is sent to an upper layer of an execution engine by a data sending operator in the Doris, to output a final data query result.

In this embodiment, after the aggregation result of the history data and the aggregation result of the real-time data are merged through step S504 to obtain the merged data, further, the merged data may be sent to the upper layer of the execution engine by a Data Sender operator in the Doris, to output the final data query result. In other words, after the aggregation result of history data and real-time data are merged, the processed result may be further flowed into the Data Sender operator to perform a shuffle operation on the processed result which is used for the subsequent calculation process. The final data query result is sent to the FE side of Doris by the Result Sender for display or output.

Through the above processing, in the data query process, the aggregation calculation only need to be performed on the real-time data, where the RowSet calculation results of other history data can be acquired from the cache, which can save most (e.g., nearly 80%) of reading and calculation quantity to improve the concurrency effect of data query.

It should be noted that, in the present disclosure, the core step to improve the concurrency effect of data query is to cache the aggregation result of history data through the preset cache system. In order to ensure the concurrency effect, various maintenance plans for the preset cache system are provided in the present disclosure, which include three approaches as follows.

1. Cache insertion: when a new RowSet result is calculated, it is inserted into the preset cache system. If the amount of cached data is large and has exceeded a preset threshold of the preset cache system space (e.g., memory), the data will not be written into the preset cache system. Instead, data query will be processed by reading the disk in the next calculation, and the management side is prompted to increase the configuration of the preset cache system (e.g., memory) to ensure the data storage and query performance of the Doris. The preset threshold may be set according to the practical situation, which is not limited in the present disclosure, for example, the threshold may be ⅓.

2. Cache replacement: in the case that a preset expiration time and/or cache capacity is reached in the preset cache system, the aggregation result of history data with a lowest usage frequency in the preset cache system are deleted by using the least recently used (LRU) algorithm, to realize the replacement of the cache.

3. Cache invalidation: in the data query process in Doris, the query type may typically be related to the time. For example, after 8 o'clock in this morning, almost no data of the previous day will be queried. Hence, in the background thread, the data cached at the previous day may be invalidated by using the corresponding SQL.

Based on the above description, a data query method based on Doris is provided according to the present disclosure. First, history data in bottom operator in a storage engine architecture of the Doris is obtained, and an aggregation calculation is performed on the history data to obtain an aggregation result of the history data in the aggregated bottom operator. Then, the aggregation result of the history data is cached by a preset cache system. In response to a data query request on the Doris, an aggregation calculation is performed on real-time data in a newly inserted bottom operator in the Doris to obtain an aggregate result of the real-time data. The aggregation result of history data is obtained from the preset cache system, and the aggregation result of history data are merged with the aggregation result of the real-time data to obtain merged data. The merged data is sent to an upper layer of execution engine by a data sending operator in the Doris to output a final data query result. In the embodiment of the present disclosure, the aggregation result of the history data in the bottom operator is first cached. Thus, when the data query is performed on Doris, only the real-time data in the newly inserted bottom operator needs to be aggregated, and other aggregation result of history data can be acquired directly from the cache, which can save calculation resources of IO and CPU and improve query concurrency effect.

Second Embodiment

In this embodiment, a data query apparatus based on Doris is provided. The related content of the data query apparatus can refer to the foregoing method embodiments.

Figure 8:
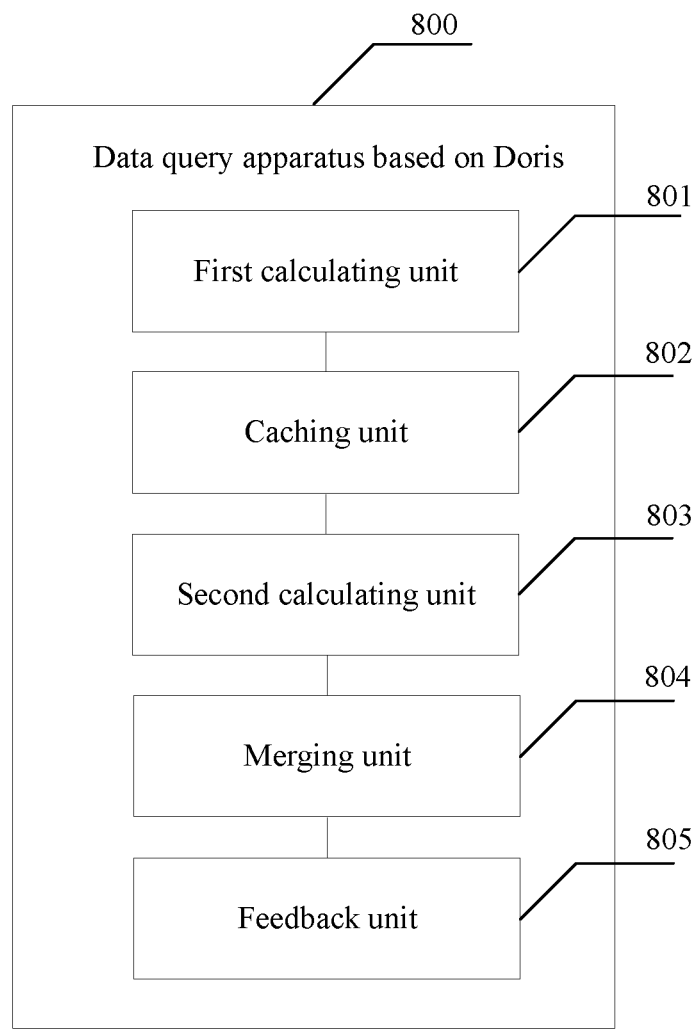
FIG. 8 is a schematic diagram of a composition of a data query apparatus based on Doris according to an embodiment of the present disclosure.

FIG. 8 is a schematic diagram of a composition of a data query apparatus based on Doris according to an embodiment of the present disclosure. Referring to FIG. 8, the data query apparatus based on Doris 800 includes as follows.

A first calculating unit 801 is configured to acquire history data in a bottom operator in a storage engine architecture of the Doris, and perform an aggregation calculation on the history data to obtain an aggregation result of the aggregated history data in the bottom operator.

A caching unit 802 is configured to cache the aggregation result of the history data by a preset cache system.

A second calculating unit 803 is configured to perform an aggregation calculation on real-time data in a newly inserted bottom operator in the Doris, in response to a data query request on the Doris, to obtain an aggregate result of the real-time data.

A merging unit 804 is configured to acquire the aggregation result of the history data from the preset cache system, and merge the aggregation result of the history data with the aggregation result of the real-time data to obtain merged data.

A feedback unit 805 is configured to send the merged data to an upper layer of an execution engine by a data sending operator in the Doris to output a final data query result.

In an implementation of this embodiment, the caching unit 802 is specifically configured to cache the aggregation result of the history data in a key-value pair manner by the preset cache system.

In an implementation of this embodiment, a key of the aggregation result of the history data includes at least one of a bottom operator reader, a filter, a column, a local aggregation operator, and a sort operator.

In an implementation of this embodiment, a storage structure of a value of the aggregation result of the history data is a result block list.

In an implementation of this embodiment, the merging unit 804 is specifically configured to organize the aggregation result of the history data and the aggregation result of the real-time data in a list manner, and perform union processing on the aggregation result of the history data and the aggregation result of the real-time data to obtain processed data, in a case that a top layer of the key of the aggregation result of the history data is the bottom operator reader, filter or column; or organize the aggregation result of the history data and the aggregation result of the real-time data in a hash manner, and perform a hash processing on the aggregation result of the real-time data, insert an obtained processed result into a hash result corresponding to the aggregation result of the history data, in a case that the top layer of the key of the aggregation result of the history data is a local aggregation operator; or organize the aggregation result of the history data and the aggregation result of the real-time data in an ordered list manner or an ordered hash map manner, and insert the aggregation result of the real-time data into an ordered result set by an insertion sort manner, in a case that the top layer of the key of the aggregation result of the history data is a sort operator.

In an implementation of this embodiment, the apparatus further includes: a deletion unit configured to delete the aggregation result of history data with a lowest usage frequency in the preset cache system by using a least recently used algorithm, in a case that a preset expiration time and/or cache capacity is reached in the preset cache system.

In an implementation of this embodiment, the preset cache system is a memory.

Further, a data query device based on Doris is provided according to an embodiment of the present disclosure. The data query device based on Doris includes: a processor, a memory, and a system bus.

The processor and the memory are connected through the system bus.

The memory is configured to store one or more programs. The one or more programs include instructions, and the instructions, when executed by the processor, cause the processor to implement any implementation of the data query method based on Doris.

Further, a computer-readable storage medium is provided according to an embodiment of the present disclosure. Instructions are stored on the computer-readable storage medium. The instructions, when running on the terminal device, cause the terminal device to implement any implementation of the data query method based on Doris.

From the above description of the implementations, those skilled in the art can clearly understand that all or part of the steps in the methods of the above embodiments can be implemented by means of software plus a necessary general hardware platform. Based on this understanding, the essence of the technical solutions of the present disclosure or the parts that contributes to the conventional technology can be embodied in the form of software products, and the computer software products can be stored in storage media, such as ROM/RAMs, disks, optical disks, etc., including several instructions to make a computer device (which may be a personal computer, a server, or a network communication device such as a media gateway, etc.) implement the method according to the various embodiments or some parts of the embodiments of the present disclosure.

Each embodiment in this specification is described in a progressive manner, where each embodiment focuses on the differences from other embodiments, and the same and similar parts of each embodiment can be referred to each other. In particular, for the apparatus disclosed in the embodiment, since it corresponds to the method disclosed in the embodiments, the description is relatively simple, and the related parts can be referred to the description of the method part.

It should be noted that the relationship terms "first", "second" and the like herein are used for distinguishing an entity or operation from another entity or operation, but not intended to necessitate or imply an actual relationship or order between these entities or operations. Further, the terms "include", "comprise" or any variant thereof are intended to encompass nonexclusive inclusion such that a process, method, article or device including a series of elements includes not only those elements but also other elements which have not been listed definitely or an element(s) inherent to the process, method, article or device. Unless expressively limited otherwise, a process, method, article or device limited by "comprising/including a(n) . . . " does not exclude existence of other identical elements in such process, method, article or device.

The above are only specific implementations of the present disclosure, such that those skilled in the art can implement or utilize the present disclosure. It is obvious for those skilled in the art to make many modifications to these embodiments. The general principle defined herein may be applied to other embodiments without departing from the spirit or scope of the present disclosure. Hence, the present disclosure is not limited to the embodiments illustrated herein, rather, should be defined by the broadest scope consistent with the principle and novel features disclosed herein.

The invention claimed is:

1. A data query method based on Doris, comprising:
   acquiring history data in a bottom operator in a storage engine architecture of the Doris, and performing an aggregation calculation on the history data to obtain an aggregation result of the history data in the bottom operator;
   caching, by a preset cache system, the aggregation result of the history data in a key-value pair manner, wherein a key of the aggregation result of the history data comprises a bottom operator reader, and further comprises at least one of a filter, a column, a local aggregation operator, or a sort operator, wherein a value of the aggregation result of the history data is set in the form of a result block list, and wherein the data of the result block list is stored in a set of column-oriented storage structures in memory of the preset cache system;
   performing an aggregation calculation on real-time data in a newly inserted bottom operator in the Doris, in response to a data query request on the Doris, to obtain an aggregate result of the real-time data;
   acquiring the aggregation result of the history data from the preset cache system, and merging the aggregation result of the history data with the aggregation result of the real-time data to obtain merged data; and
   sending, by a data sending operator in the Doris, the merged data to an upper layer of an execution engine, to output a final data query result.

2. The method according to claim 1, wherein the merging the aggregation result of the history data with the aggregation result of the real-time data to obtain merged data comprises:
   in a case that a top layer of the key of the aggregation result of the history data is the bottom operator reader, the filter or the column, organizing the aggregation result of the history data and the aggregation result of the real-time data in a list manner, and performing union processing on the aggregation result of the history data and the aggregation result of the real-time data to obtain processed data; or
   in a case that the top layer of the key of the aggregation result of the history data is the local aggregation operator, organizing the aggregation result of the history data and the aggregation result of the real-time data in a hash manner, performing a hash processing on the aggregation result of the real-time data, and inserting an obtained processed result into a hash result corresponding to the aggregation result of the history data; or
   in a case that the top layer of the key of the aggregation result of the history data is the sort operator, organizing the aggregation result of the history data and the aggregation result of the real-time data in an ordered list manner or an ordered hash map manner, and inserting the aggregation result of the real-time data into an ordered result set in an insertion sort manner.

3. The method according to claim 1, further comprising:
   in a case that a preset expiration time and/or cache capacity is reached in the preset cache system, deleting the aggregation result of history data with a lowest usage frequency in the preset cache system by using a least recently used algorithm.

4. The method according to claim 1, wherein the preset cache system is a memory.

5. A data query device based on Doris, comprising:
   a processor;
   a memory; and
   a system bus,
   wherein the processor and the memory are connected through the system bus; and
   the memory is configured to store one or more programs, the one or more programs include instructions, and the instructions, when executed by the processor, cause the processor to:
   acquire history data in a bottom operator in a storage engine architecture of the Doris, and perform an aggregation calculation on the history data to obtain an aggregation result of the history data in the bottom operator;
   cache, by a preset cache system, the aggregation result of the history data in a key-value pair manner, wherein a key of the aggregation result of the history data comprises a bottom operator reader, and further comprises at least one of a filter, a column, a local aggregation operator, or a sort operator, wherein a value of the aggregation result of the history data is set in the form of a result block list, and wherein the data of the result block list is stored in a set of column-oriented storage structures in memory of the preset cache system;
   perform an aggregation calculation on real-time data in a newly inserted bottom operator in the Doris, in response to a data query request on the Doris, to obtain an aggregate result of the real-time data;
   acquire the aggregation result of the history data from the preset cache system, and merge the aggregation result of the history data with the aggregation result of the real-time data to obtain merged data; and
   send, by a data sending operator in the Doris, the merged data to an upper layer of an execution engine, to output a final data query result.

6. The data query device according to claim 5, wherein the instructions, when executed by the processor, cause the processor to:
   in a case that a top layer of the key of the aggregation result of the history data is the bottom operator reader, the filter or the column, organize the aggregation result of the history data and the aggregation result of the real-time data in a list manner, and perform union processing on the aggregation result of the history data and the aggregation result of the real-time data to obtain processed data; or in a case that the top layer of the key of the aggregation result of the history data is the local aggregation operator, organize the aggregation result of the history data and the aggregation result of the real-time data in a hash manner, perform a hash processing on the aggregation result of the real-time data, and insert an obtained processed result into a hash result corresponding to the aggregation result of the history data; or in a case that the top layer of the key of the aggregation result of the history data is the sort operator, organize the aggregation result of the history data and the aggregation result of the real-time data in an ordered list manner or an ordered hash map manner, and insert the aggregation result of the real-time data into an ordered result set in an insertion sort manner.

7. The data query device according to claim 5, wherein the instructions, when executed by the processor, cause the processor to:

in a case that a preset expiration time and/or cache capacity is reached in the preset cache system, delete the aggregation result of history data with a lowest usage frequency in the preset cache system by using a least recently used algorithm.

8. The data query device according to claim 5, wherein the preset cache system is a memory.

9. A non-transitory computer-readable storage medium, storing instructions thereon, wherein the instructions, when running on a terminal device, cause the terminal device to:

acquire history data in a bottom operator in a storage engine architecture of the Doris, and perform an aggregation calculation on the history data to obtain an aggregation result of the history data in the bottom operator;

cache, by a preset cache system, the aggregation result of the history data in a key-value pair manner, wherein a key of the aggregation result of the history data comprises a bottom operator reader, and further comprises at least one of a filter, a column, a local aggregation operator, or a sort operator, wherein a value of the aggregation result of the history data is set in the form of a result block list, and wherein the data of the result block list is stored in a set of column-oriented storage structures in memory of the preset cache system;

perform an aggregation calculation on real-time data in a newly inserted bottom operator in the Doris, in response to a data query request on the Doris, to obtain an aggregate result of the real-time data;

acquire the aggregation result of the history data from the preset cache system, and merge the aggregation result of the history data with the aggregation result of the real-time data to obtain merged data; and send, by a data sending operator in the Doris, the merged data to an upper layer of an execution engine, to output a final data query result.

10. The non-transitory computer-readable storage medium according to claim 9, wherein the instructions, when running on a terminal device, cause the terminal device to:

in a case that a top layer of the key of the aggregation result of the history data is the bottom operator reader, the filter or the column, organize the aggregation result of the history data and the aggregation result of the real-time data in a list manner, and perform union processing on the aggregation result of the history data and the aggregation result of the real-time data to obtain processed data; or in a case that the top layer of the key of the aggregation result of the history data is the local aggregation operator, organize the aggregation result of the history data and the aggregation result of the real-time data in a hash manner, perform a hash processing on the aggregation result of the real-time data, and insert an obtained processed result into a hash result corresponding to the aggregation result of the history data; or in a case that the top layer of the key of the aggregation result of the history data is the sort operator, organize the aggregation result of the history data and the aggregation result of the real-time data in an ordered list manner or an ordered hash map manner, and insert the aggregation result of the real-time data into an ordered result set in an insertion sort manner.

11. The non-transitory computer-readable storage medium according to claim 9, wherein the instructions, when running on a terminal device, cause the terminal device to:

in a case that a preset expiration time and/or cache capacity is reached in the preset cache system, delete the aggregation result of history data with a lowest usage frequency in the preset cache system by using a least recently used algorithm.

* * * * *